United States Patent Office 3,399,252
Patented Aug. 27, 1968

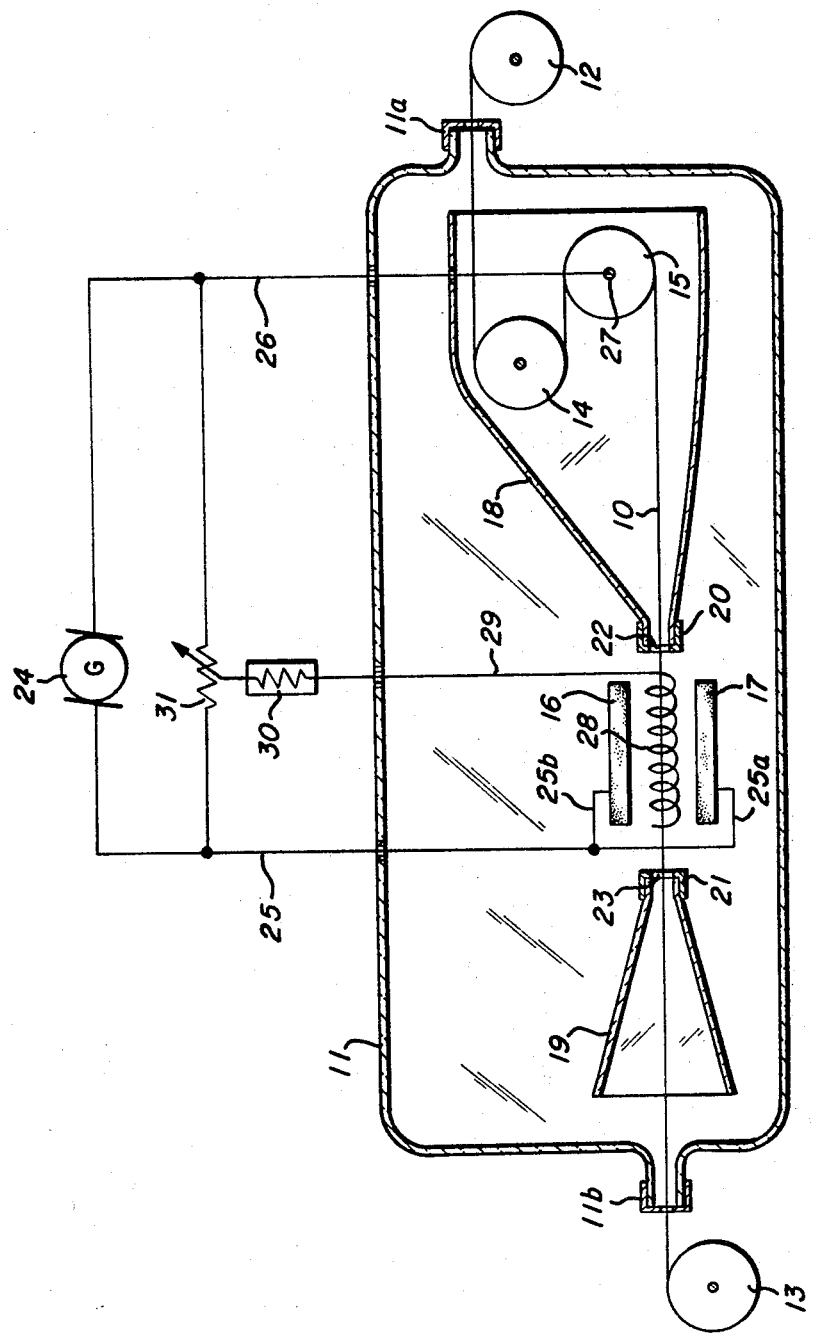

3,399,252
METHOD AND APPARATUS FOR MANUFACTURE OF HIGH STRENGTH AND HIGH MODULUS CARBON FILAMENTS
Ralph L. Hough, Springfield, and Robert T. Schwartz, Dayton, Ohio, assignors to the United States of America as represented by the Secretary of the Air Force
Filed Apr. 15, 1966, Ser. No. 543,776
14 Claims. (Cl. 264—27)

The invention described herein may be manufactured and used by or for the United States Government for governmental purposes without payment to us of any royalty thereon.

The present invention relates to the formation of high strength and high modulus carbon strands or filaments by a process and apparatus which lend themselves to relatively efficient and economical continuous production.

In the art of reinforced structural plastic materials, particularly those wherein high modulus and high strength-to-density ratios are desired, it has been found advantageous to employ high strength, high modulus strands or fibers as the reinforcing components in a variety of plastic matrices. To obtain a more uniform reinforcement and improved integration, it is preferred in many cases that the reinforcing component be continuous or of such length that it may be continuously wound within the plastic, usually in helical fashion with the successive convolutions thereof in contact or in substantial contact with each other. Thus, considerable attention has been focused of late upon the production of carbon in the form of a strand or a yarn composed of one or more fibers or filaments which is of substantial length.

While the need for such high strength, high modulus reinforcements has grown at a rapid pace, the known methods for manufacturing the same have remained cumbersome, time-consuming and costly. Until very recently, a filamentous substrate, usually of a ductile metal, to be subsequently coated with carbon or a carbon-forming material, has been required in the manufacturing process. To provide a filament composed entirely of carbon however, and to eliminate the need for the metal substrate, more recent developments in the field have involved the conversion of organic polymeric strands into high strength, high modulus carbon by the application of heat and/or stress. Because the conversion temperatures are so extremely high however, the heating apparatus has been expensive to construct and to operate; and the method has therefore been costly and cumbersome. For example, where the carbon yarn is to be heated to processing temperature of on the order of from 2500 to 3000 degrees centigrade in an electric oven or induction heating unit, great amounts of electrical power have had to be consumed; and the delays involved in bringing the heater to the required temperature or in allowing it to cool for repairs or replacement of yarn or the like have represented serious inefficiencies in the manufacturing process.

It is accordingly an object of the present invention to provide a simple, efficient and economical method for the manufacture of improved high strength and high modulus carbon material, particularly in the form of strands such as single or multiple continuous filaments or multiple fiber yarns.

Still another object of the invention is to provide a method and apparatus for the continuous manufacture of carbon filaments which will have improved structural and physical properties and will be sufficiently flexible to resist breakage and other complications in their handling during their subsequent incorporation in reinforced plastic or other composites.

To achieve these and other objects and advantages which will appear from a reading of the following disclosure, the present invention teaches the utilization as a source or precursory material of pre-formed pyrolyzed polymeric filaments or strands which may be composed of a plurality of staple-length fibers or of one or more continuous or relatively long filaments. Some of such materials which are at present commercially available are the carbonized or partially carbonized yarns or rovings of staple-length fibers. These carbon yarns are normally formed by subjecting naturally occuring or man-made fibers or yarns having high carbon content to a controlled sequence of increasing temperatures in inert or reducing atmospheres until only the carbonaceous components thereof remain. While it is true this same sequence of increasing temperatures can be continued or extended until the high strength, high modulus fibers sought by the present invention are obtained, the extremely high temperatures so required and the demands upon the power systems to supply such heating lead to serious inefficiencies which, when coupled with the time involved in dealing with such temperatures in the manufacturing process, have seriously limited the production and hence the presently available supply of high quality carbon reinforcing materials.

According to the teachings of this invention however, the carbonized or nearly corbonized precursory materials such as carbonized organic polymers or commercially available carbonized cellulosic materials, are brought immediately to temperatures of on the order of from 2500 to 3000 degrees centigrade, which are comparable for example to recognized graphitization temperatures and the yarn, at the time and place where it is so heated, is tensed by the application of longitudinal forces which result in its elongation of up to 100 percent of its initial length. According to the preferred method and apparatus of this invention, the heating and stretching of the yarn are accomplished simultaneously by electric energization, for example in a glow-discharge device, wherein the carbon yarn is one of what may be considered as a pair of spaced electrodes across which an electromotive potential difference is established. The geometry of the electrode cooperating with the yarn is such that a non-uniform electrical field is created focusing the electrical energization at the yarn; and, where the yarn is made the positively charged electrode, electrons are cause to be emitted from the companion electrode and to bombard the yarn as a result of which its temperature is almost instantaneously raised to processing temperature. While the yarn is moving through the glow-discharge tube and the portion thereof adjacent to or in proximity with the companion electrode is heated to processing temperature, the yarn is tensed, for example by the controlled differential of the speeds of its take-up roller and of its supply roller, to accomplish the desired stretching and a laminar alignment of the carbon crystals or molecules being substantially simultaneously formed in response to the elevated temperature.

The amount of tension required to effect the elongation varies in inverse proportion to the temperature at which the yarn is heated at the time the tensing occurs. While the exact force necessary to achieve the desired range of elongation will also vary according to the mechanical and physical characteristics of the yarn such as its length, diameter and the composition of its fibers or filaments, the number of such fibers or filaments involved, the degree of their compactness and the like, simple experimentation may readily establish the necessary tension. In general it has been found that, up to an elongation within the range of from 80 to 100 percent of its original pre-stressed length, the greater the yarn can be stretched at the time of its processing, the greater will be the improvement in its desired physical properties. Accordingly, the fact that the method and apparatus of the present invention have been found to accommodate and allow for the greatest degree of stretching without breakage is an important feature contributing to improved carbon strands and to improved reinforced plastic composites incorporating the same.

When the application of the tensile stress is thus made to occur while the yarn is heated to graphitization temperature, it has been found that not only is the carbon material within the strand graphitized, but also is the crystallinity of the graphite controlled and oriented in a manner which, although it is not completely understood, results in a clearly demonstrable improvement in the strength of the strand as well as in its conductivity, refractory capability and resistance to oxidative degradation at elevated temperatures. At the same time, though the within disclosure is not intended to be dependent upon the fact, it is theorized that the coincident application of the heat and tension causes the carbon crystals to align themselves in superimposed layers thereby providing planes longitudinally of the strand along which the successive superimposed layers may move relative to each other thereby markedly improving the strand flexibility and reducing the likelihood of breakage during formation, storage and handling of the strands in their ultimate incorporation in reinforced plastic composites or other articles of manufacture.

It is not necessary in the practice of this invention that a precise schedule or series of time intervals be involved in bringing the yarn to graphitization temperature. In consequence of this, it has been found that the above described glow-discharge tube may be used to heat the yarn without heating the space around it, thereby greatly reducing the heating power requirements and the time that has heretofore been lost in waiting for the build-up to and the cooling down from the high graphitization temepratures. Another particularly beneficial adjunct of the use of a glow-discharge tube in the practice of the invention is that the elongation of the yarn may conveniently be made to occur at the place where the yarn is heated. This stretching then reduces the diameter of the strand thereby increasing the concentration of the electrical energy at its surface which then increases the heating of the yarn at precisely the point where the maximum heating is desired, especially to allow still further elongation without breakage.

In many instances of the use of glow-discharge electrodes however, it has been found that yarns which are processed according to the teachings hereof lack the uniformity of composition and physical properties that were at other times achieved or reasonably anticipated. Consequently, an important modification of the above described apparatus includes the placement of a grid or third electrode member between the yarn and the secondary electrodes in close proximity to the yarn and so energizing the grid that its electrical potential is relatively close to that of the strands. In a specific embodiment of this modification, the grid is in the form of an electrically conductive coil wound in closely spaced relation about the yarn, and means are provided for so energizing the coil that its electrical potential and polarity are as close to the potential and polarity of the strand as possible. At the same time the electric current caused to pass through the grid is limited to the extent that excessive electrical heating of the coil itself will not occur. The beneficial effects of this interposition and energization of the grid are believed to derive from the fact that the grid eliminates the electrostatic attraction that tends to occur between the strands as the primary electrodes and the secondary electrodes where their potential difference is of a sufficient magnitude to cause the desired heating. With the electrostatic attraction thus eliminated, the individual fibers do not become frayed or distorted and the discontinuities in the over-all processing that are believed to have the result of such electrostatic fraying have been found to be eliminated.

The invention thus generally described may be more clearly understood by reference to the following detailed description of certain preferred embodiments thereof in connection with which reference may be had to the appended drawing which is a schematic elevational view of a preferred apparatus for practicing the invention.

Referring now to the drawing, the carbonized or nearly carbonized strand or yarn 10, of the type, for example, that is commercially available, is shown to be positioned within and generally longitudinally of a glow-discharge tube 11 which is hollow and generally cylindrical in shape and is provided with suitable end fittings or closures 11a and 11b each of which has a small passage axially thereof to accommodate the movement of the strand while preserving a controlled atmosphere in the tube. In addition to commercially available carbon yarns, the precursory materials of which the strands 10 to be treated by the present invention are composed may include a variety of carbonized or carbon-containing polymers. The movement of the yarn 10 longitudinally of the tube 11 is established by the controlled movement of the supply reel 12 about which a single length of the yarn 10 is wound and upon which it is stored and supplied and of the take-up reel or spool 13 upon which the yarn is continuously wound after it has emerged from the tube. As means for guiding and further controlling the movement of the yarn 10 through the tube 11 are the rotatably mounted wheels 14 and 15, the rotational axes of which are in a plane which is angularly disposed to the axis of the tube 11 and the principal direction of the movement of the yarn 10 therethrough. The wheels 14 and 15 are positioned in such relative proximity to each other that the yarn travels in an "S-pattern" or in a double reverse bend around them whereby substantially one-half or more of the circumference of each wheel is in contact with the yarn. This greater contact between the yarn 10 and the wheels 14 and 15 enables the wheels to exert a greater influence upon the introduction of an electromotive force to the yarn and upon the rate of its travel through the tube, all as will be hereinafter further explained.

Centrally of the tube 11 is positioned the companion or secondary electrode assembly which, in the case of the illustrated embodiment, comprises the carbon rods 16 and 17 which are so positioned relative to the yarn that, as it passes through them, the electromotive force or potential difference between the rods and the yarn will cause the yarn to be heated to temperatures as high as 3500 degrees centigrade. It is to be understood that the electrodes may be of a variety of configurations including a single hollow cylindrical or sleeve-type unit axially through which the yarn may pass. So also, the secondary electrode units may be composed of a variety of electrically conductive materials which have sufficient refractory capacity to withstand the elevated temperatures generated by the electrical system of which they are a part. The electrical energization of the secondary electrodes 16 and 17 and of the yarn 10, which may be regarded as a primary electrode, may be established according to conventional practice by connecting the secondary electrode units 16 and 17 to a direct current power source such as the generator 24 which is also connected to the electrically conductive wheels 14 and 15 with which the yarn is in circumferential contact.

The voltage necessary for the ionization of the atmosphere within the glow-discharge tube around the yarn, for the passage of an electrical current through the ionized cloud, and for the heating of the yarn will depend upon many variables including the relative size of and spacing between the yarn and the electrodes, the pressure and composition of the atmosphere surrounding them and the like. It has been found however, that where the rods 16 and 17 in the illustrated embodiment are approximately .250 inch in diameter and are spaced by a distance of approximately 10 millimeters from the yarn which itself is composed of individual filaments with a diameter of on the order of 8 microns and where the glow-discharge tube 11 is filled with an inert gas; viz., argon under a total pressure of from 13 to 14 millimeters of mercury, a relatively low electromotive potential difference or voltage of on the order of only 480 or less volts will produce the desired temperatures of from 2500 to 3500 degrees centigrade. In the interests of keeping this voltage between the secondary electrodes and the yarn as low as possible, it has been found that the breakdown or ionization potential; i.e., that potential difference between the electrode and the yarn at which the gas within the discharge tube becomes ionized and therefore capable of transmitting sufficient current to heat the yarn, will be less if the yarn is the positively charged electrode in the system than if it is negatively charged. Beyond this, it has been found that positively charging the yarn results in improved quality of the high-strength and high modulus formation thereof; and it is theorized that this may be due in part to the fact that the positive polarity prevents erosion of the yarn by the positive ion bombardment thereof that would occur if the yarn were negatively charged.

Cooperating with this arrangement and energization of the electrodes 16 and 17 and the yarn 10 to focus or concentrate the effect of the electrical heating are the shrouds 18 and 19 which may be composed of glass or other dielectric material. These shrouds are of a generally hollow tubular or funnel-shaped construction to enclose the yarn 10 within the tube 11 and to shield it from the influence of the electrical energy in the secondary electrodes 16 and 17 except for that limited distance wherein the yarn is directly between such electrodes. To complete this enclosure, the shrouds 18 and 19 may be provided at their opposed open ends with the caps or plugs 20 and 21 respectively which are composed of a refractory dielectric material such as boron nitride and have only a small bore or passage such as 22 and 23 axially thereof to allow for the longitudinal movement of the yarn therethrough.

In the case of the specific embodiment illustrated in the drawing, one terminal of the direct current power source 24 is connected by the branched conductor 25, 25a and 25b to the secondary electrodes 16 and 17 and the other terminal is connected by the conductor 26 to the axle 27 of the wheel 15 which, because it and its axle are composed of an electrically conductive metal such as a nickel-steel alloy and because substantially one-half or more of the wheel's peripheral surface is in contact with the yarn 10, will electrically energize the yarn thereby causing it to serve as the primary electrode in the heating zone between the shroud caps 20 and 21.

To prevent what has been experimentally determined as and is believed to be the deleterious effect resulting from the electrostatic attraction attending the difference in electrical polarity between the secondary electrodes 16 and 17 on the one hand and the yarn 10 as the primary electrode on the other, a modification of the illustrated embodiment of the invention includes the encirclement of the yarn 10 along that portion of its length between the electrodes 16 and 17 by the electrically conductive coil or helix 28 which is electrically associated with the direct current power source 24 by the conductor 29 which is provided with a resistor 30 to limit the current passing through the coil 28 and with the variable rheostat unit 31 which is electrically connected in parallel with the main power supply conductors 25 and 26. By manipulation of the rheostat 31 and proper selection of the resistor 30, the electrical potential supplied to the field distortion grid or coil 28 is controlled so that its energization and polarity are sufficiently close to those of the yarn 10 that there will be little or no electrostatic attraction between the coil and the yarn. Stated otherwise, the effect of the coil is to distort the electrostatic field between the carbon rods 16 and 17 on the one hand and the yarn 10 on the other so that the fraying of the individual fibers of the yarn is not induced by electrostatic attraction. At the same time, the electrical current of the coil, relative to its spacing from and the energization and polarity of the secondary electrodes 16 and 17, is such that the coil will not be excessively heated. Consequently, this arrangement and energization of the coil 28 is such that it constitutes a shield which protects the yarn from the electrostatic force of the secondary electrodes 16 and 17 on the one hand but does not interfere with their heating of the yarn on the other. Because the yarn is preferably positively charged, the coil is also preferably positive.

With provision thus made for bringing the yarn at the point where it continues to pass through the electrodes 16 and 17 to the desired temperature, the practice of the within invention requires only that means be provided for applying sufficient tensile stress to the yarn at this point. Such stress may be simply provided by braking or otherwise limiting the freedom of rotation of the supply reel 12 and/or the guiding wheels 14 and 15 while at the same time powering the take-up reel 13 to rotate at a greater speed as a result of which the entire length of the yarn 10 between the take-up reel 13 and the guide wheels 14 and 15 or the supply roller 12 will be under the tensile stress. Since however the elongation of the yarn will take place only at some point along the segment of its length which is heated, the stress will result in elongating strain almost entirely at the point within the electrodes where the temperature of the yarn is at its peak. While improvement in the physical properties of the completed strand is achieved where the elongation is as high from 80 to 100 percent of the original strand length, elongation of as low as five percent has been found to produce beneficial results. Additionally it is to be noted that, even where no stress is applied or elongation achieved, the properties of the strand may be improved by utilization of the field distortion grid or coil taught herein.

While the within invention has been described in considerable detail in connection with certain specific embodiments thereof, it is to be understood that the foregoing particularization has been for the purpose of illustration only and does not limit the invention as it is defined in the subjoined claims.

We claim:

1. A method for the continuous manufacture of flexible, yet high strength, high modulus carbon filaments comprising continuously moving a pre-formed pyrolyzed polymeric strand through a glow-discharge tube within which is positioned at least one electrically energized secondary electrode, electrically energizing said strand to act as a primary electrode whereby the atmosphere within said tube between said secondary electrode and said strand will transmit an electric current and heat said strand to its processing temperature and applying a tensile stress to at least the portion of said strand in proximity to said secondary electrode while the strand is so heated.

2. A method according to claim 1 wherein said strand is heated to a temperature of from 2500 to 3500 degrees centigrade at the time of the application of said stress.

3. A method according to claim 1 wherein the tensile stress applied to said strand is of that magnitude which will stretch the strand to from 5 percent to 100 percent of its length prior to the application of such stress.

4. A method according to claim 1 wherein said strand is a carbon yarn composed of multiple fibers and it is electrically charged to have a positive polarity relative to the polarity of said secondary electrode.

5. A method according to claim 1 wherein said strand is a carbon yarn composed of multiple fibers and comprising the additional step of disrupting the electrostatic field created between said strand and said secondary electrode upon the electrical energization thereof.

6. A method for the continuous manufacture of flexible, yet high strength, high modulus carbon strands composed of a plurality of individual fibers comprising moving a pre-formed pyrolyzed polymeric strand of such fibers through a glow-discharge tube within which is positioned at least one electrically energized secondary electrode, electrically energizing said strand to act as a primary electrode whereby the atmosphere within said tube between said secondary electrode and said strand will transmit an electric current and heat said strand, and disrupting the electrostatic field between said secondary electrode and said strand whereby the former will not electrostatically attract the latter or the individual fibers thereof.

7. A method according to claim 6 wherein said electrostatic field is disrupted by interposing a field distortion grid between said secondary electrode and said strand at a point near said strand and electrically energizing said grid to have a polarity and electromotive potential which more nearly approximates those of said strand than those of said secondary electrode.

8. An apparatus for the manufacture of carbon strands comprising a glow-discharge tube for heating a preformed pyrolyzed polymeric strand to processing temperature, means for continuously moving said pre-formed strand through said tube, at least one electrically energized companion electrode positioned within said tube and in electrically influencing proximity to at least a portion of said pre-formed strand, means for establishing an electromotive potential difference between said companion electrode and said strand as a primary electrode to raise the temperature of said strand, and simultaneously acting means for stretching at least the portion of said strand so heated to from 5 to 100 percent of its original length.

9. An apparatus according to claim 8 wherein said glow-discharge tube comprises means for introducing an ionizable gas therein and means for reducing the pressure thereof.

10. An apparatus according to claim 8 wherein said glow-discharge tube comprises electrically insulating means internally thereof for shielding the portions of the strand therein that are not in proximity to said secondary electrode from the influence of the electrical energization thereof.

11. An apparatus according to claim 8 wherein said glow-discharge tube comprises an electrically conductive field distortion coil between said secondary electrode and said strand and means for electrically energizing said coil to have an energy level and polarity closer to those of said strand than to those of said secondary electrode whereby the strand will be protected from the electrostatic influence of said secondary electrode while remaining subject to the heating influence of the electrical energization thereof.

12. An apparatus according to claim 8 wherein the means for stretching said strand comprise means for limiting the rate of the introduction thereof into said tube and means for pulling said strand through said tube at a speed greater than that at which it is introduced thereinto.

13. An apparatus for the manufacture of carbon strands comprising a glow-discharge tube for heating a preformed pyrolized polymeric strand composed of multiple fibers of relatively short length as compared to the length of said strand, means for moving said strand through said tube, at least one electrically energized companion electrode positioned within said tube and in electrically influencing proximity to at least a portion of said strand, means for establishing an electromotive potential difference between said companion electrode and said strand as a primary electrode to raise the temperature of said strand, and means positioned between said strand and said companion electrode for disrupting the electrostatic field created by the establishment of the electromotive potential difference between the two.

14. An apparatus according to claim 13 wherein said disrupting means comprise a coil in closely spaced relation to said strand and means for electrically enegizing said coil to have an energy level and polarity closer to those of said strand than to those of said companion electrode.

References Cited

UNITED STATES PATENTS

| | | | |
|---|---|---|---|
| 3,135,679 | 6/1964 | Rothacker | 204—165 X |
| 3,179,482 | 4/1965 | Kassenbeck | 8—2 |
| 3,288,638 | 11/1966 | Van Paassen et al. | 204—165 X |
| 3,313,597 | 4/1967 | Cranch et al. | 264—27 X |

FOREIGN PATENTS

| | | |
|---|---|---|
| 337,642 | 6/1921 | Germany. |

ROBERT F. WHITE, *Primary Examiner.*

T. J. CARVIS, *Assistant Examiner.*